(12) United States Patent  
Fujita (10) Patent No.: US 10,628,020 B2  
(45) Date of Patent: Apr. 21, 2020

(54) PROJECTION TYPE DISPLAY DEVICE (71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/892,371

(22) Filed: Feb. 8, 2018

(65) Prior Publication Data

US 2018/0164998 A1 Jun. 14, 2018

Related U.S. Application Data

(63) Continuation of application No. PCT/JP2016/069542, filed on Jun. 30, 2016.

(30) Foreign Application Priority Data

Aug. 26, 2015 (JP) .................................. 2015-167019

(51) Int. Cl.
*G06F 3/0484* (2013.01)
*B60K 35/00* (2006.01)
(Continued)

(52) U.S. Cl.
CPC .......... *G06F 3/04847* (2013.01); *B60K 11/04* (2013.01); *B60K 11/085* (2013.01);
(Continued)

(58) Field of Classification Search
CPC ......... G06T 11/00; G06T 3/40; G06F 3/0488; G06F 3/04817; G06F 3/04845;
(Continued)

(56) References Cited

U.S. PATENT DOCUMENTS

| 7,957,896 B2 | 6/2011 | Kawakami et al. |
| 9,535,497 B2 * | 1/2017 | Rose ........................ G06F 3/013 |

(Continued)

FOREIGN PATENT DOCUMENTS

| JP | H10185625 | 7/1998 |
| JP | H10307545 | 11/1998 |

(Continued)

OTHER PUBLICATIONS

"International Search Report (Form PCT/ISA/210)" of PCT/JP2016/069542, dated Sep. 27, 2016, with English translation thereof, pp. 1-5.

(Continued)

*Primary Examiner* — Sae Won Yoon
(74) *Attorney, Agent, or Firm* — JCIPRNET (57) ABSTRACT

Provided is a projection type display device capable of performing display of information according to a driver's desire. An HUD includes light sources; a light modulation element that spatially modulates light emitted from the light sources on the basis of projection image data; a projection unit that projects image light that is spatially modulated by the light modulation element onto a projection surface that is a part of a windshield 1 mounted in an automobile; a designation information acquisition unit that acquires designation information for designating at least one of a maximum number of pieces of content included in the projection image data, display sizes of the pieces of content, or arrangement layouts of the pieces of content on the basis of information input through an operation unit; and an image information generation unit that generates the projection image data on the basis of the designation information acquired.

10 Claims, 8 Drawing Sheets

(51) Int. Cl.
*B60K 11/08* (2006.01)
*G02B 27/01* (2006.01)
*B60K 11/04* (2006.01)
*G09G 3/00* (2006.01)
*H04N 9/31* (2006.01)
*G09G 5/02* (2006.01)
*B60K 37/00* (2006.01)
*G06T 3/40* (2006.01)
*G06F 3/14* (2006.01)
*G06F 3/0481* (2013.01)
*G09G 5/391* (2006.01)
*G03B 21/20* (2006.01)
*G03B 33/08* (2006.01)
*B60K 37/02* (2006.01)

(52) U.S. Cl.
CPC .............. *B60K 35/00* (2013.01); *B60K 37/02* (2013.01); *G02B 27/01* (2013.01); *G02B 27/0101* (2013.01); *G06F 3/04845* (2013.01); *G06T 3/40* (2013.01); *G09G 3/001* (2013.01); *G09G 5/02* (2013.01); *H04N 9/3141* (2013.01); *B60K 2370/148* (2019.05); *B60K 2370/155* (2019.05); *B60K 2370/1529* (2019.05); *B60K 2370/1868* (2019.05); *B60K 2370/31* (2019.05); *B60K 2370/334* (2019.05); *G02B 2027/014* (2013.01); *G02B 2027/0141* (2013.01); *G03B 21/2013* (2013.01); *G03B 33/08* (2013.01); *G06F 3/04817* (2013.01); *G06F 3/1423* (2013.01); *G09G 5/391* (2013.01); *G09G 2380/10* (2013.01)

(58) Field of Classification Search
CPC ... G06F 3/04847; G06F 3/1423; B60K 37/06; B60K 11/04; B60K 11/085; B60K 35/00; B60K 37/02; B60K 2370/148; B60K 2370/1529; B60K 2370/155; B60K 2370/1868; B60K 2370/31; B60K 2370/334; G01C 21/365; G02B 27/01; G02B 27/0101; G02B 2027/014; G02B 2027/0141; G09G 3/001; G09G 5/02; G09G 5/391; G09G 2380/10; H04N 9/3141; G03B 21/2013; G03B 33/08
USPC ........................................................ 345/665
See application file for complete search history.

(56) References Cited

U.S. PATENT DOCUMENTS

| | | | |
|---|---|---|---|
| 2007/0244613 A1 | 10/2007 | Ishikawa et al. | |
| 2008/0243893 A1* | 10/2008 | Suehiro ................. | H04N 1/2112 |
| 2008/0309474 A1 | 12/2008 | Okamoto et al. | |
| 2009/0179745 A1 | 7/2009 | Okamoto et al. | |
| 2010/0274476 A1 | 10/2010 | Kojima et al. | |
| 2011/0227942 A1 | 9/2011 | Fujimoto et al. | |
| 2011/0279739 A1* | 11/2011 | Nairn ..................... | G03B 21/56 348/759 |
| 2012/0224062 A1* | 9/2012 | Lacoste ................ | G01C 21/365 348/148 |
| 2013/0027426 A1* | 1/2013 | Sasaki .................... | B60K 35/00 345/629 |
| 2013/0343053 A1* | 12/2013 | Holman ................. | G03B 21/00 362/241 |
| 2014/0293230 A1* | 10/2014 | Arase .................. | G02B 27/0101 353/13 |
| 2014/0309870 A1* | 10/2014 | Ricci ..................... | B60W 50/14 701/36 |
| 2015/0095826 A1* | 4/2015 | Ahn ....................... | G06F 3/0488 715/769 |
| 2015/0367859 A1* | 12/2015 | Roth ..................... | B60K 37/00 701/36 |
| 2016/0266283 A1* | 9/2016 | Segawa ................. | G02B 3/0006 |
| 2016/0291813 A1* | 10/2016 | Lee ...................... | G06F 3/04817 |
| 2016/0320900 A1* | 11/2016 | Nabe ..................... | B60K 35/00 |
| 2016/0371813 A1* | 12/2016 | Fujie ...................... | B60W 50/14 |

FOREIGN PATENT DOCUMENTS

| | | |
|---|---|---|
| JP | 2000134253 | 5/2000 |
| JP | 2001121989 | 5/2001 |
| JP | 2003009022 | 1/2003 |
| JP | 2005067408 | 3/2005 |
| JP | 2006062399 | 3/2006 |
| JP | 2007090967 | 4/2007 |
| JP | 2007302223 | 11/2007 |
| JP | 2009093343 | 4/2009 |
| JP | 2010079844 | 4/2010 |
| JP | 2010198653 | 9/2010 |
| WO | 2006022191 | 3/2006 |
| WO | 2009034796 | 3/2009 |
| WO | 2009066656 | 5/2009 |

OTHER PUBLICATIONS

"International Preliminary Report on Patentability (Form PCT/IPEA/409) of PCT/JP2016/069542", dated Sep. 8, 2017, with English translation thereof, pp. 1-15.

"Office Action of Japan Counterpart Application," dated Mar. 6, 2018, with English translation thereof, p.1-p.9.

* cited by examiner

PROJECTION TYPE DISPLAY DEVICE

CROSS-REFERENCE TO RELATED APPLICATIONS

This application is a Continuation of PCT International Application No. PCT/JP2016/069542 filed on Jun. 30, 2016, which claims priority under 35 U.S.C § 119(a) to Japanese Patent Application No. 2015-167019 filed on Aug. 26, 2015. Each of the above application(s) is hereby expressly incorporated by reference, in its entirety, into the present application.

BACKGROUND OF THE INVENTION

1. Field of the Invention

The present invention relates to a projection type display device.

2. Description of the Related Art

A head-up display (HUD) for a vehicle that uses a windshield or a combiner that is provided in the vicinity of the windshield as a screen, inside a vehicle such as an automobile, a train, a heavy machine, a construction machine, an aircraft, a ship, or an agricultural machine and projects projection light onto the screen to display an image is known.

In a case where the HUD is used, a user (for example, a driver) who is in the vehicle may visually recognize an image displayed on the windshield or the like by the projection light projected by the HUD as a virtual image in a state where the image is superimposed on a scene in front of the automobile.

As the HUD of the vehicle, an HUD in which information to be displayed as a virtual image or a display range of the information is not fixed but is variable according to a driving condition or the like of the vehicle is known (for example, JP2010-079844A and JP2009-093343A).

JP2010-079844A discloses an HUD for a vehicle that includes load level detection means for detecting a driving load level of a driver and display range determination means for determining a display range of driving assistance information to be displayed on a windshield on the basis of a signal from the load level detection means.

JP2009-093343A discloses an HUD for a vehicle that calculates a risk level in consideration of a moving body that is present in the vicinity of an automobile and presents suitable driving assistance information according to the risk level.

SUMMARY OF THE INVENTION

In the HUDs disclosed in JP2010-079844A and JP2009-093343A, information to be displayed as a virtual image or a display range of the information is automatically changed.

However, the kind of information necessary for a driver, a display range of the information, or the like varies according to a hobby, a preference, a driving style, or the like of the driver, which cannot be optimized for all drivers in common.

In the HUDs disclosed in JP2010-079844A and JP2009-093343A, the information to be displayed as the virtual image, the display range of the information, or the like can be changed, but display optimized for each driver cannot be performed.

The invention has been made in consideration of the above-mentioned problems, and an object of the invention is to provide a projection type display device capable of performing display of information according to a driver's desire.

According to an aspect of the invention, there is provided a projection type display device comprising: a light source; a light modulation element that spatially modulates light emitted from the light source on the basis of image information; a projection unit that projects image light that is spatially modulated by the light modulation element onto a projection surface of a vehicle; an operation unit that includes a display unit on which a screen corresponding to a virtual image of content which is formed by the image light projected on the projection surface is displayed, and operates an operation of changing content according to a driver's voice in the vehicle; a designation information acquisition unit that acquires designation information for designating at least one of a maximum number of pieces of content included in the image information, a display size of the content, or an arrangement layout of the content on the basis of information input through the operation unit; and an image information generation unit that generates the image information on the basis of the designation information acquired by the designation information acquisition unit.

According to the invention, it is possible to provide a projection type display device capable of performing display of information according to a driver's desire.

DESCRIPTION OF THE PREFERRED EMBODIMENTS

Hereinafter, an embodiment of the invention will be described with reference to the accompanying drawings.

Figure 1:
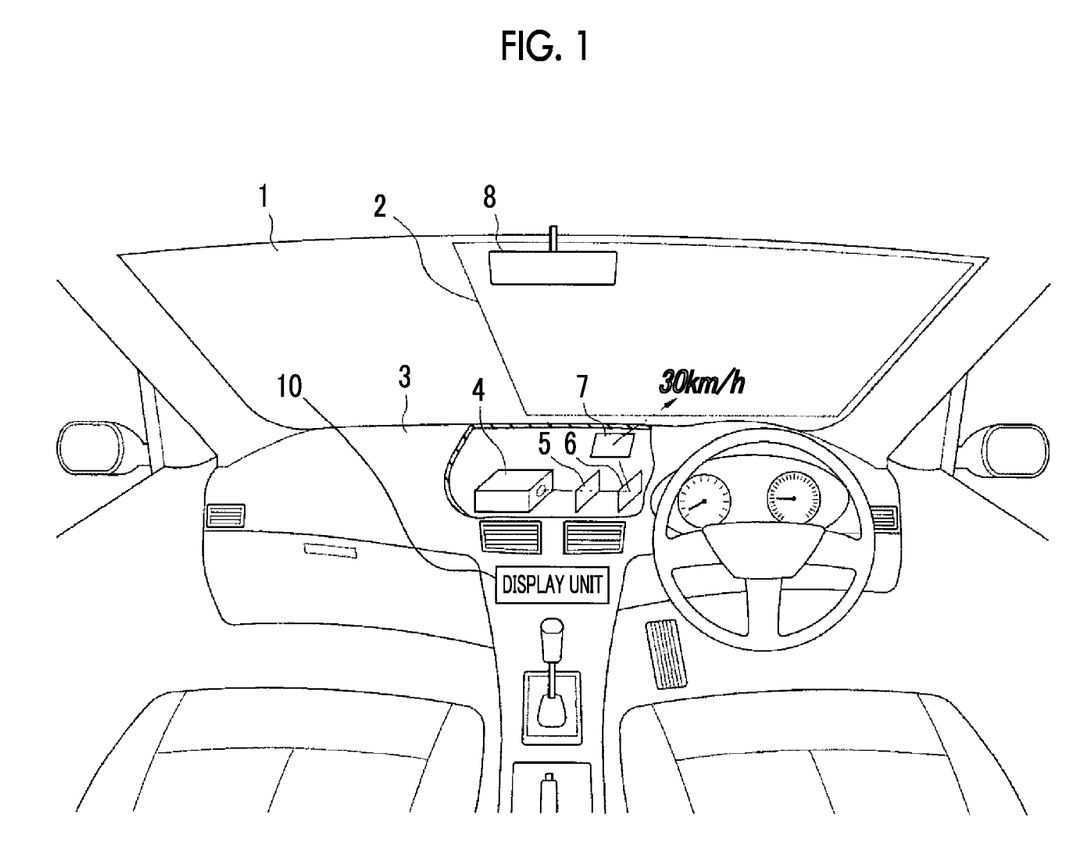
FIG. 1 is a diagram showing a schematic configuration of an HUD that is an embodiment of a projection type display device of the invention.

FIG. 1 is a diagram showing a schematic configuration of an HUD that is an embodiment of a projection type display device of the invention. The HUD is mounted in an automobile, and is configured so that a partial range of a windshield 1 of the automobile is used as a projection surface 2 of image light and a driver of the automobile can visually recognize a virtual image by the image light projected onto the projection surface 2. The HUD in FIG. 1 may be mounted in a vehicle such as a train, a heavy machine, a construction machine, an aircraft, a ship, or an agricultural machine, as well as the automobile.

The HUD that is shown in FIG. 1 includes the projection surface 2 that is a partial region of the windshield 1 of the automobile, a light source device 4 that is provided in a dashboard 3, a diffuser plate 5 that is similarly provided in the dashboard 3, a reflecting mirror 6, and a magnifying glass 7.

The diffuser plate 5 diffuses light emitted from the light source device 4 to become a plane light source. The reflecting mirror 6 reflects the light that is changed to the plane light source by the diffuser plate 5 toward the magnifying glass 7. The magnifying glass 7 magnifies the light from the reflecting mirror 6, and projects the light onto the projection surface 2 that is a partial range of the windshield 1. The projection surface 2 is processed so that the light projected from the magnifying glass 7 reflects toward the eyes of the driver.

Here, a configuration in which light is projected onto the windshield 1 is shown, but a configuration in which light is projected onto a combiner that is disposed in the vicinity of the windshield 1 may be used. In this case, the combiner forms the projection surface 2.

The driver of the automobile can visually recognize content such as icons or letters relating to driving using a virtual image based on light that is projected onto the projection surface 2 and is reflected by the projection surface 2. The projection surface 2 has a function for transmitting light from the outside of the windshield 1 (outside the vehicle). Thus, the driver may visually recognize an image in which a virtual image based on light projected from the magnifying glass 7 and an outside scene are superimposed.

Figure 2:
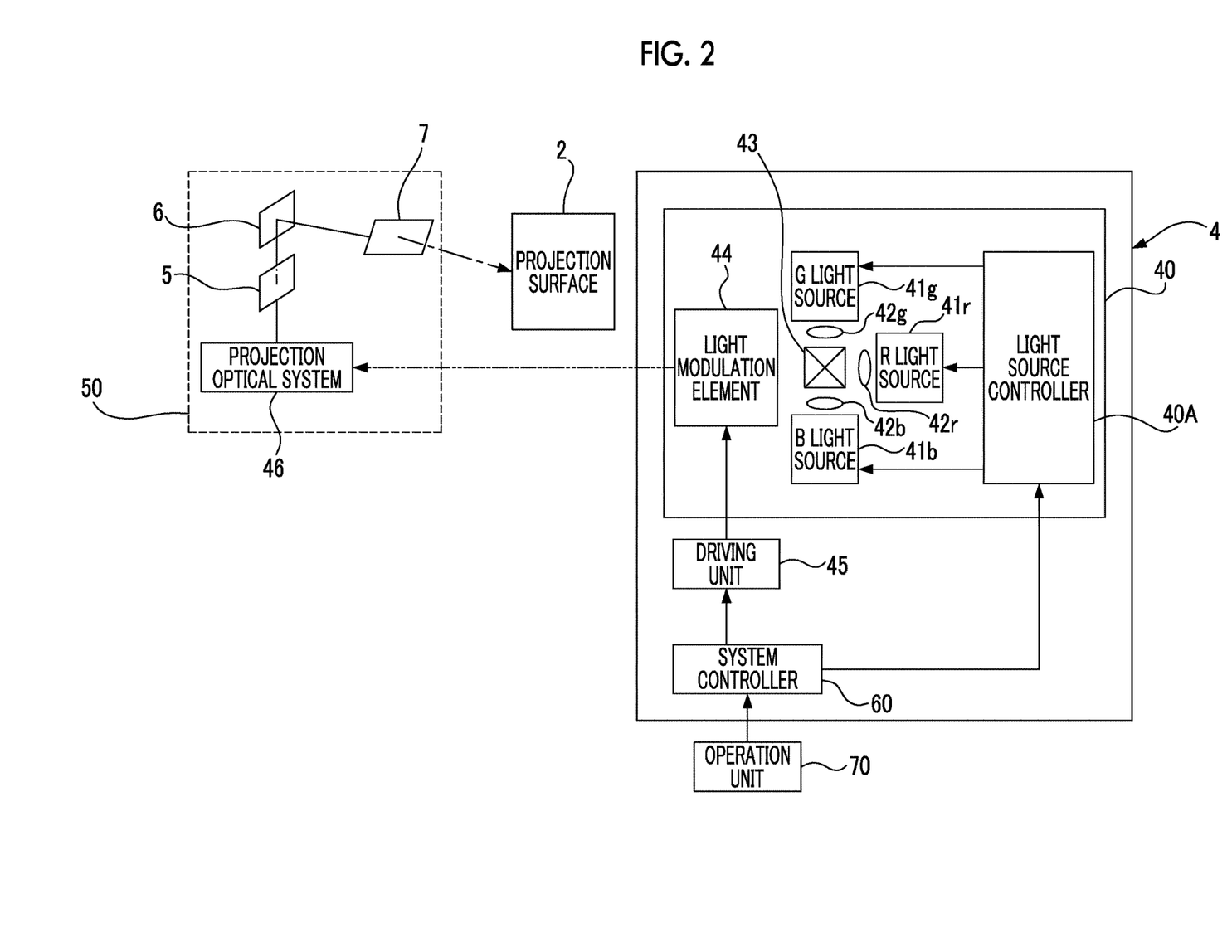
FIG. 2 is a schematic diagram showing a detailed configuration example of the HUD shown in FIG. 1.

FIG. 2 is a schematic diagram showing a detailed configuration example of the HUD shown in FIG. 1.

As shown in FIG. 2, the HUD includes the projection surface 2, the light source device 4, a projection unit 50, and an operation unit 70.

The light source device 4 includes a light source unit 40, a driving unit 45 that drives a light modulation element 44 that is included in the light source unit 40, and a system controller 60 that generally controls the entire components.

The light source unit 40 includes a light source controller 40A, an R light source 41$r$ that is a red light source that emits red light, a G light source 41$g$ that is a green light source that emits green light, a B light source 41$b$ that is a blue light source that emits blue light, a dichroic prism 43, a collimator lens 42$r$ that is provided between the R light source 41$r$ and the dichroic prism 43, a collimator lens 42$g$ that is provided between the G light source 41$g$ and the dichroic prism 43, a collimator lens 42$b$ that is provided between the B light source 41$b$ and the dichroic prism 43, and a light modulation element 44. The R light source 41$r$, the G light source 41$g$, and the B light source 41$b$ form light sources of the HUD.

The R light source 41$r$, the G light source 41$g$, and the B light source 41$b$ respectively employ a light emitting element such as laser or a light emitting diode (LED). In this embodiment, an example in which the HUD is configured to include three light sources of the R light source 41$r$, the G light source 41$g$, and the B light source 41$b$ is shown, but the number of light sources may be 1, 2, 4 or more.

The light source controller 40A sets the amounts of luminescence of the R light source 41$r$, the G light source 41$g$, and the B light source 41$b$ into predetermined luminescence amount patterns, and performs a control for sequentially emitting light from the R light source 41$r$, the G light source 41$g$, and the B light source 41$b$ according to the luminescence amount patterns.

The dichroic prism 43 is an optical member for guiding light emitted from each of the R light source 41$r$, the G light source 41$g$, and the B light source 41$b$ to the same optical path. The dichroic prism 43 transmits red light that is collimated by the collimator lens 42$r$ to be emitted to the light modulation element 44. Further, the dichroic prism 43 reflects green light that is collimated by the collimator lens 42$g$ to be emitted to the light modulation element 44. Further, the dichroic prism 43 reflects blue light that is collimated by the collimator lens 42$b$ to be emitted to the light modulation element 44. An optical member having such a function of guiding light to the same optical path is not limited to a dichroic prism. For example, a cross dichroic mirror may be used.

The light modulation element 44 spatially modulates light emitted from the dichroic prism 43 on the basis of projection image data that is image information, and emits image light (red color image light, blue color image light, and green color image light) based on the projection image data to the projection unit 50.

The light modulation element 44 may employ, for example, a liquid crystal on silicon (LCOS), a digital micromirror device (DMD), a micro electro mechanical systems (MEMS) element, a liquid crystal display device, or the like.

The driving unit 45 drives the light modulation element 44 according to projection image data input from the system controller 60, and emits image light based on the projection image data to the projection unit 50.

The projection unit 50 includes a projection optical system 46, a diffuser plate 5, a reflecting mirror 6, and a magnifying glass 7.

The projection optical system 46 is an optical system for projecting image light that is spatially modulated by the light modulation element 44 onto the diffuser plate 5. The optical system is not limited to a lens, and may employ a scanner.

The projection unit 50 forms a projection unit that projects image light that is spatially modulated by the light modulation element 44 onto the projection surface 2. The projection unit 50 is optically designed so that an image based on image light projected onto the projection surface 2 can be visually recognized by a driver as a virtual image formed at a position in front of the windshield 1.

The system controller 60 controls the light source controller 40A and the driving unit 45, so that image light based on the projection image data is emitted from the light source unit 40 onto the projection unit 50.

The operation unit 70 is an interface that includes a touch panel, physical operating buttons, or the like that belong to a display unit 10 that is mounted in the automobile, through which a variety of information is input to the system controller 60.

Figure 3:
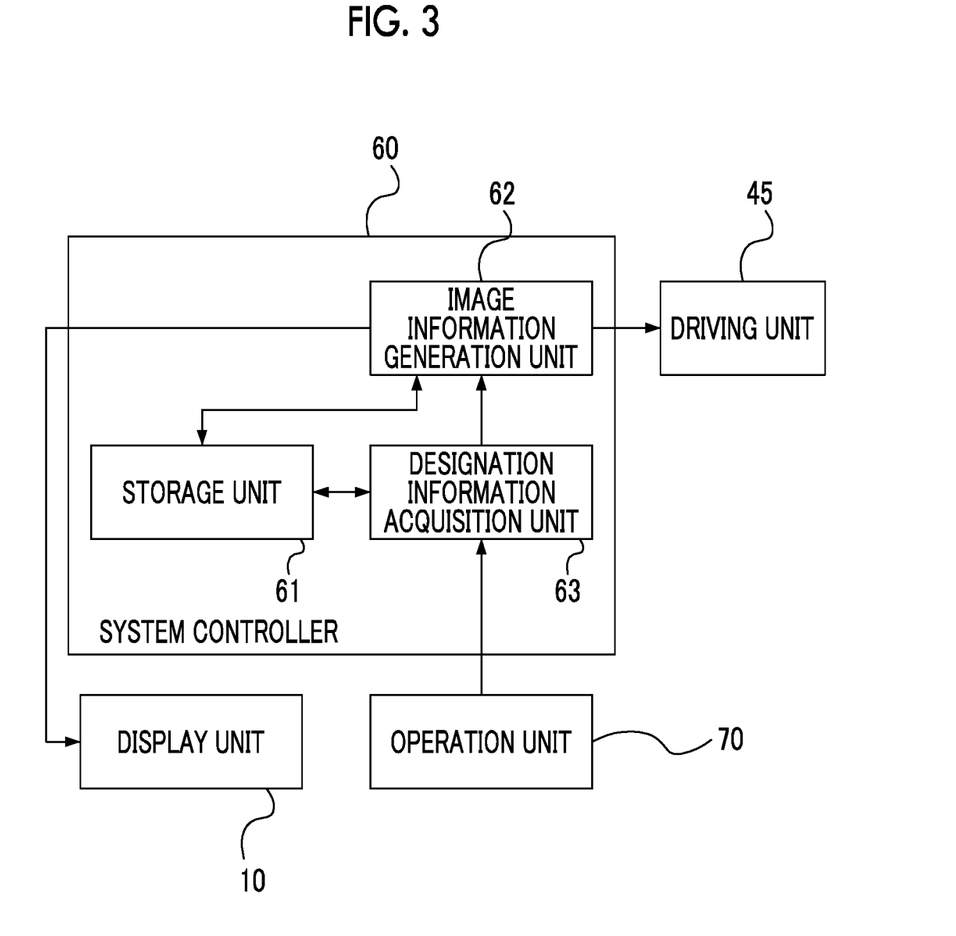
FIG. 3 is a block diagram showing a block configuration of a system controller 60 of the HUD shown in FIG. 1.

FIG. 3 is a diagram showing a block configuration of the system controller 60 in FIG. 2.

The system controller 60 includes a processor that functions as an image information generation unit 62 and a designation information acquisition unit 63, and a storage unit 61 such as a read-only memory (ROM).

The image information generation unit 62 generates projection image data including character information for notifying a traveling speed of the automobile, an icon for notifying the driver that gasoline is lacking, an icon for giving a warning relating to driving to the driver, an icon for notifying an incoming call of a mobile phone paired with the HUD, character information, and an icon for performing navigation to a destination, and outputs the projection image data to the driving unit 45. The character information or the icons included in the projection image data form content.

The image information generation unit 62 controls details of the content included in the projection image data or the number thereof according to driving conditions to perform driving assistance suitable for the driving conditions.

For example, the image information generation unit 62 detects the amount of gasoline, and generates projection image data including the icon for notifying that the amount of gasoline is lacking only in a case where the amount is less than a threshold value.

Further, the image information generation unit 62 monitors information indicating the presence or absence of an incoming call from a paired mobile phone, and generates projection image data including the icon for notifying the incoming call of the mobile phone only in a case where information indicating that there is an incoming call from the mobile phone is received.

In addition, the image information generation unit 62 generates projection image data including the character information and the icon for performing navigation to the destination in cooperation with a navigation device mounted on the automobile.

The driving unit 45 drives the light modulation element 44 according to projection image data input from the image information generation unit 62 to project light based on the projection image data onto the projection surface 2.

In the storage unit 61, a plurality of pieces of reference projection image data that is reference image information in which a maximum number of pieces of content included in projection image data, display sizes of the pieces of content, and arrangement layouts of the pieces of content are designated in advance, and customized projection image data in a state where editing is performed with respect to the reference projection image data by a user are stored.

The designation information acquisition unit 63 acquires designation information for designating at least one of the maximum number of pieces of content included in the projection image data, the display sizes of the pieces of content, or the arrangement layouts of the pieces of content.

Specifically, the designation information acquisition unit 63 reads out reference projection image data selected by an operation of the operation unit 70 from the plurality of pieces of reference projection image data (reference information) stored in the storage unit 61, and edits the read-out reference projection image data on the basis of information input through the operation unit 70 to generate customized projection image data. The reference projection image data forms the reference information. The designation information acquisition unit 63 acquires the customized projection image data as designation information, and stores the result in the storage unit 61.

The image information generation unit 62 generates projection image data on the basis of the customized projection image data acquired by the designation information acquisition unit 63. That is, the maximum number of pieces of content included in the projection image data, the display sizes of the pieces of content, and the arrangement layouts of the pieces of content are determined on the basis of the customized projection image data stored in the storage unit 61.

Next, methods for setting a screen (a screen that is visually recognized as a virtual image in front of the projection surface 2) based on projection image data will be described with reference to FIGS. 4 to 11.

First, a first setting method will be described.

A driver operates the operation unit 70 to select one piece of reference projection image data from a plurality of pieces of reference projection image data. Here, a case where reference projection image data in which all pieces of content that are display targets in the HUD of FIG. 1 are disposed with predetermined display sizes and predetermined arrangement layouts is selected will be described.

The system controller 60 inputs the selected reference projection image data to the driving unit 45. The driving unit 45 drives the light modulation element 44 according to the reference projection image data to perform spatial modulation of light emitted from the light source unit 40.

Figure 4:
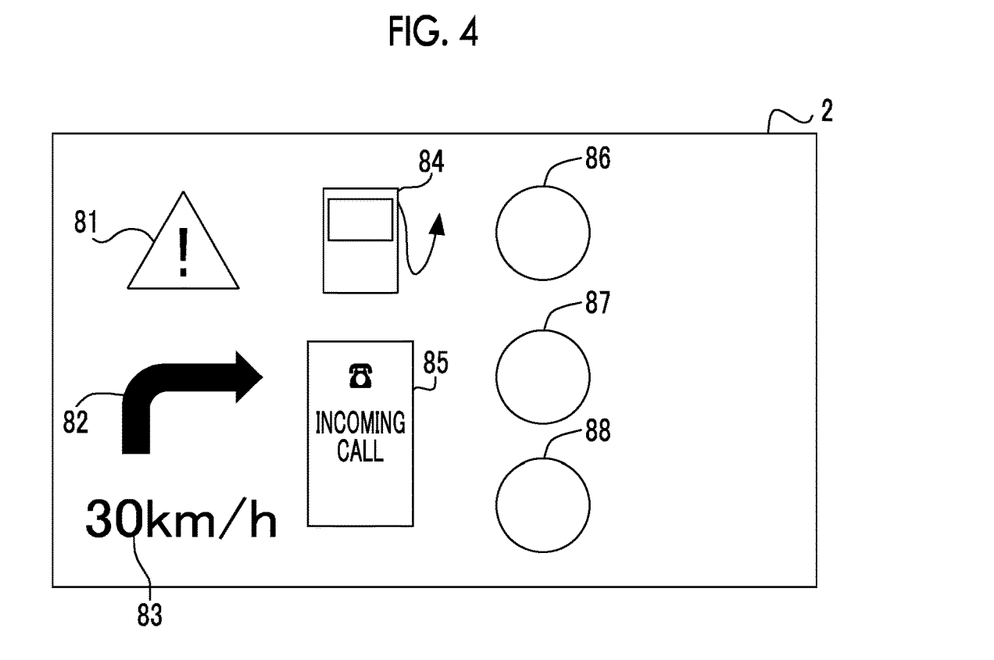
FIG. 4 is a diagram showing an example of a screen to be projected onto a projection surface 2.

For example, through the spatial modulation, a screen shown in FIG. 4 is projected onto the projection surface 2. On the screen shown in FIG. 4, all pieces of content 81 to 88 capable of being displayed by the HUD in FIG. 1 are displayed.

As respective pieces of content shown in FIG. 4, content 81 for performing warning notification, content 82 for notifying navigation information (an arrow or the like), content 83 for notifying speed information, content 84 for notifying lack of gasoline, content 85 for notifying an incoming call of a mobile phone in a vehicle, and the like are specifically shown as examples. Pieces of content 86 to 88 schematically represent content indicating different information.

Figure 5:
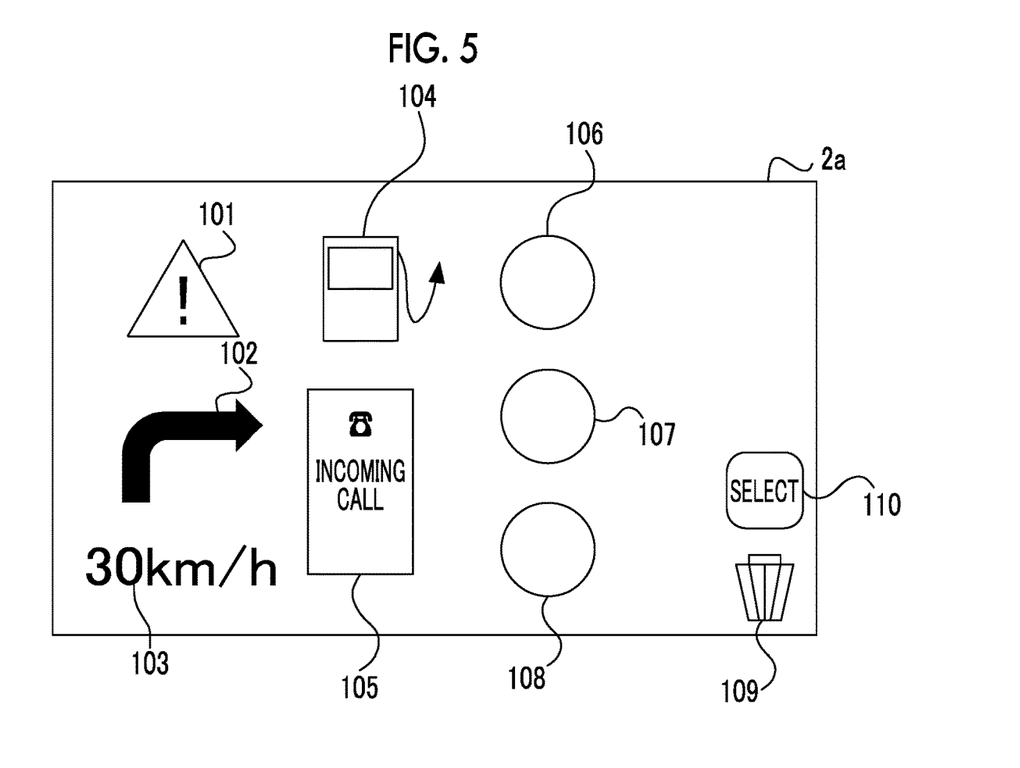
FIG. 5 is a diagram showing an example of a screen to be displayed on a display unit 10.

In a case where a driver selects reference projection image data using the operation unit 70, the image information generation unit 62 generates editing screen data for editing the selected reference projection image data from the selected reference projection image data, and transmits the editing screen data to the display unit 10 of a center console. Thus, a screen 2a shown in FIG. 5 is displayed on the display unit 10. The size of the screen 2a corresponds to the projection surface 2.

On the screen 2a shown in FIG. 5, an operation button 101 is associated with the content 81 displayed on the projection surface 2. An operation button 102 is associated with the content 82 displayed on the projection surface 2. An operation button 103 is associated with the content 83 displayed on the projection surface 2.

An operation button 104 is associated with the content 84 displayed on the projection surface 2. An operation button 105 is associated with the content 85 displayed on the projection surface 2. An operation button 106 is associated with the content 86 displayed on the projection surface 2.

An operation button 107 is associated with the content 87 displayed on the projection surface 2. An operation button 108 is associated with the content 88 displayed on the projection surface 2.

Further, on the screen 2a shown in FIG. 5, a select button 110 for performing a command for terminating an editing operation, and a trash bin icon 109 for deleting an operation button corresponding to content are displayed.

The driver may input a command for changing an arrangement layout or the size of each of the operation buttons 101 to 108 displayed on the display unit 10 to the system controller 60, through the operation of the operation unit 70.

Further, in a case where there is unnecessary content, the driver may input a command for deleting the unnecessary content to the system controller 60 by moving an operation button corresponding to the content through an operation such as drag and drop to the trash bin icon 109.

Figure 6:
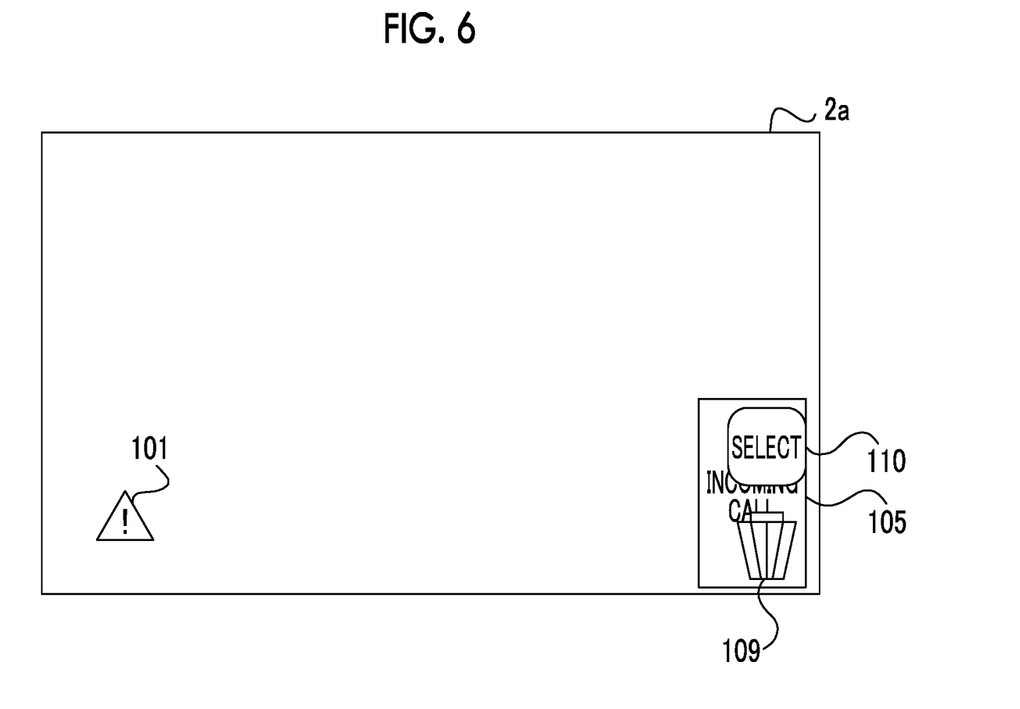
FIG. 6 is a diagram showing an example of a screen to be displayed on the display unit 10.

For example, the driver moves the operation buttons 102 to 104, and 106 to 108 displayed on the display unit 10 to the trash bin icon 109 through an operation such as drag and drop to delete the operation buttons, as shown in FIG. 6.

In addition, the driver decreases a display size of the operation button 101 and moves the operation button 101 to a lower left side of the screen 2a by an operation such as drag and drop. Further, the driver moves the operation button 105 to a lower right side of the screen 2a by an operation such as drag and drop.

In a case where an operation for change of the position of an operation button, deletion of the operation button, or change of the size of the operation button is performed with respect to the screen 2a of FIG. 5, the designation information acquisition unit 63 of the system controller 60 sequentially changes a maximum number of pieces of content in reference projection image data, display sizes of the pieces of content, and arrangement layouts of the pieces of content according to the operation, and updates the screen 2a to be displayed on the display unit 10 and a screen to be projected onto the projection surface 2.

Figure 7:
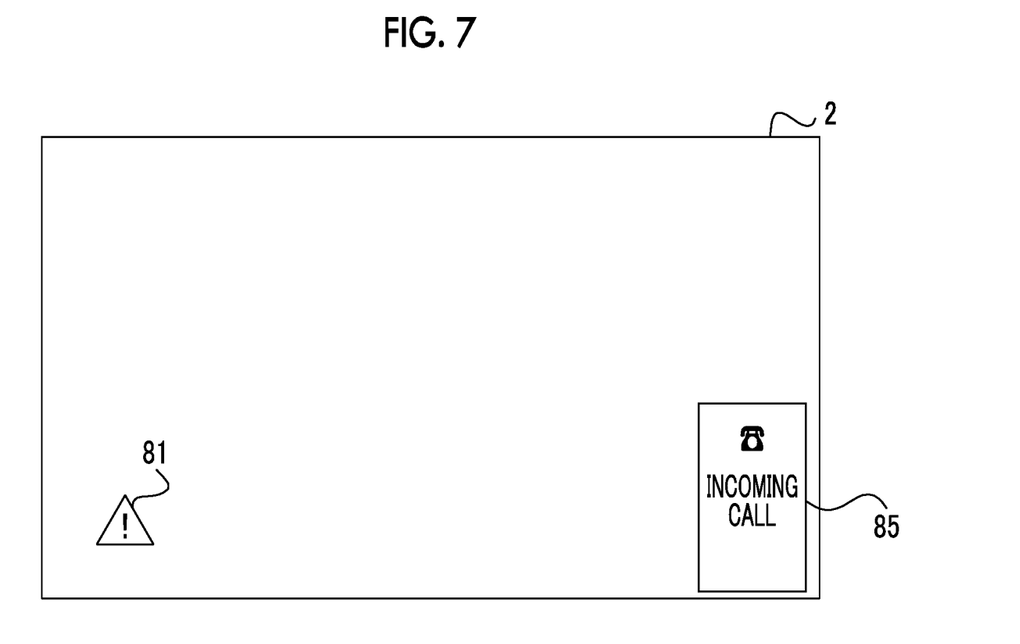
FIG. 7 is a diagram showing an example of a screen to be projected onto the projection surface 2.

For example, in a case where the operations of the operation buttons on the screen 2a shown in FIG. 5 are performed and the screen is changed into the screen 2a shown in FIG. 6, as shown in FIG. 7, a state where the content 81 is projected on a lower left side on the projection surface 2 and the content 85 is projected on a lower right side on the projection surface 2, is obtained. Thus, the driver can edit the screen 2a while checking how an actual virtual image is changed.

After these operations, the driver may determine editing with respect to the reference projection image data by pressing the select button 110. In a case where the select button 110 is pressed, the designation information acquisition unit 63 of the system controller 60 stores reference projection image data after editing (image data that forms the selected screen 2a) in the storage unit 61 as customized projection image data.

The customized projection image data has a maximum number of pieces of content of 2, and is designation information for designating, in a case where the content 81 is displayed, display of the content 81 on the lower left side of the projection surface 2 with a designated size and for designating, in a case where the content 85 is displayed, display of the content 85 on the lower right side of the projection surface 2 with a designated size.

The image information generation unit 62 generates projection image data including an icon suitable for a situation at that time on the basis of the customized projection image data stored in the storage unit 61 in this way, and inputs the projection image data to the driving unit 45.

That is, the image information generation unit 62 as necessary generates projection image data including at least one of the content 81 or the content 85, or empty projection image data that does not include content, and inputs the result to the driving unit 45.

In the above described first setting method, in a state where all pieces of content capable of being projected onto the projection surface 2 are displayed on the projection surface 2 and the display unit 10, the driver can sort out the pieces of content, change display sizes of the pieces of content, or change arrangement layouts of the pieces of content, and can perform projection of necessary information according to a driver's desire.

Next, a second setting method will be described.

A driver operates the operation unit 70 to select one piece of reference projection image data from a plurality of pieces of reference projection image data. Here, a case where recommended reference projection image data in which a maximum number of pieces of content, display sizes of the pieces of content, and arrangement layouts of the pieces of content are set in advance by a manufacturing maker of HUD will be described.

The system controller 60 inputs the selected reference projection image data to the driving unit 45. The driving unit 45 drives the light modulation element 44 according to the reference projection image data, and performs spatial modulation of light emitted from the light source unit 40.

Figure 8:
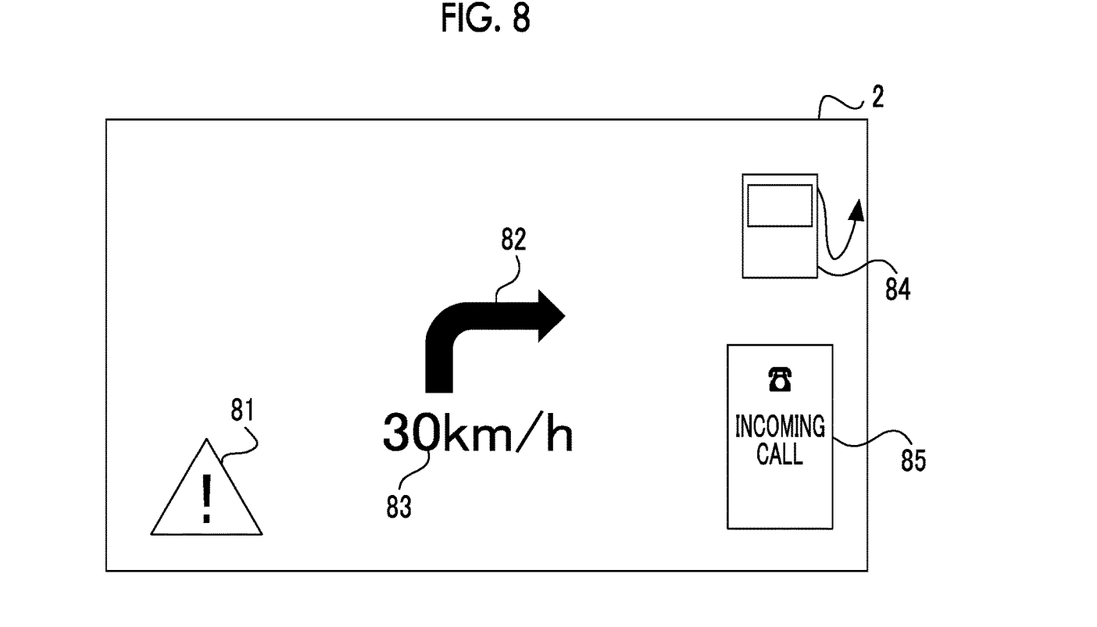
FIG. 8 is a diagram showing an example of a screen to be projected onto the projection surface 2.

For example, through the spatial modulation, a screen shown in FIG. 8 is projected onto the projection surface 2. On the screen shown in FIG. 8, pieces of content 81 to 85 are respectively displayed at predetermined positions with predetermined sizes. The screen shown in FIG. 8 is a recommended screen that is set in advance by the manufacturing maker.

In a case where the driver selects reference projection image data recommended by the manufacturing maker using the operation unit 70, the image information generation unit 62 generates editing screen data for editing the selected reference projection image data, and transmits the editing screen data to the display unit 10 of a center console. Thus, a screen shown in FIG. 9 based on the editing screen data is displayed on the display unit 10.

Figure 9:
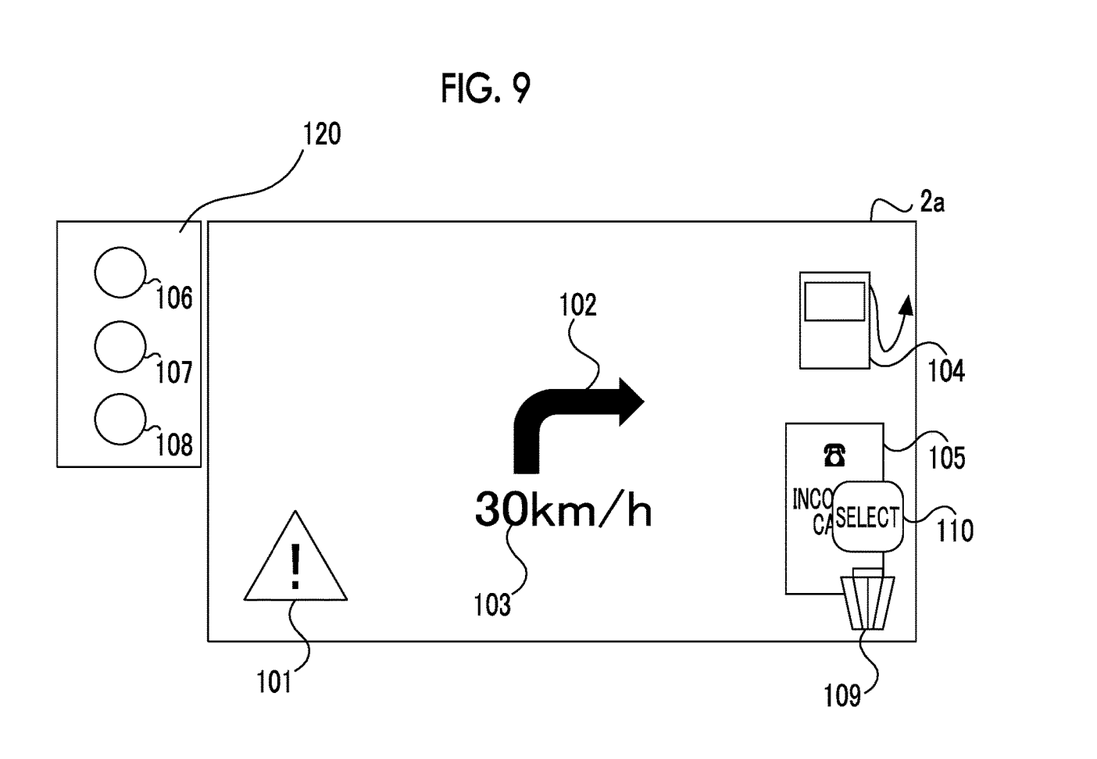
FIG. 9 is a diagram showing an example of a screen to be displayed on the display unit 10.

On the screen shown in FIG. 9, a screen 2a is a screen corresponding to the projection surface 2, and an operation panel 120 is an operation screen for performing addition of content with respect to the screen 2a.

In FIG. 9, an operation button 101 is associated with the content 81 displayed on the projection surface 2. An operation button 102 is associated with the content 82 displayed on the projection surface 2.

An operation button 103 is associated with the content 83 displayed on the projection surface 2. An operation button 104 is associated with the content 84 displayed on the projection surface 2. An operation button 105 is associated with the content 85 displayed on the projection surface 2.

Further, on the screen shown in FIG. 9, the select button 110 and the trash bin icon 109 described in FIG. 5 are displayed. The operation buttons 106 to 108 described in FIG. 5 are displayed on the operation panel 120.

The driver may input a command for changing an arrangement layout or the size of each of the operation buttons 101 to 105 displayed on the screen 2a of the display unit 10 to the system controller 60 by an operation of the operation unit 70.

Further, in a case where there is unnecessary content, the driver may input a command for deleting the unnecessary content to the system controller 60 by moving an operation button corresponding to the content through an operation such as drag and drop to the trash bin icon 109.

In addition, the driver may input a command for arranging at least one of the operation buttons 106, . . . , or 108 displayed on the operation panel 120 at a desired position on the screen 2a through an operation such as drag and drop, freely changing a display size of the operation button after arrangement, or deleting the operation button after arrangement, to the system controller 60.

In a case where an operation for change of the position of an operation button, an operation for deletion of an operation button, an operation for change of the size of an operation button, or an operation for addition of an operation button is performed with respect to the screen 2a of FIG. 9, the designation information acquisition unit 63 of the system controller 60 sequentially changes a maximum number of pieces of content in reference projection image data, display sizes of the pieces of content, and arrangement layouts of the pieces of content on the basis of the operation, and updates the screen 2a to be displayed on the display unit 10 and a screen to be projected on the projection surface 2.

For example, the driver moves the operation buttons 102 to 104 displayed on the screen 2a to the trash bin icon 109 through an operation such as drag and drop, from the state of FIG. 9, deletes the operation buttons 102 to 104, and then, arranges the operation buttons 106 and 107 of the operation panel 120 on the right side of the screen 2a through an operation such as drag and drop.

Figure 10:
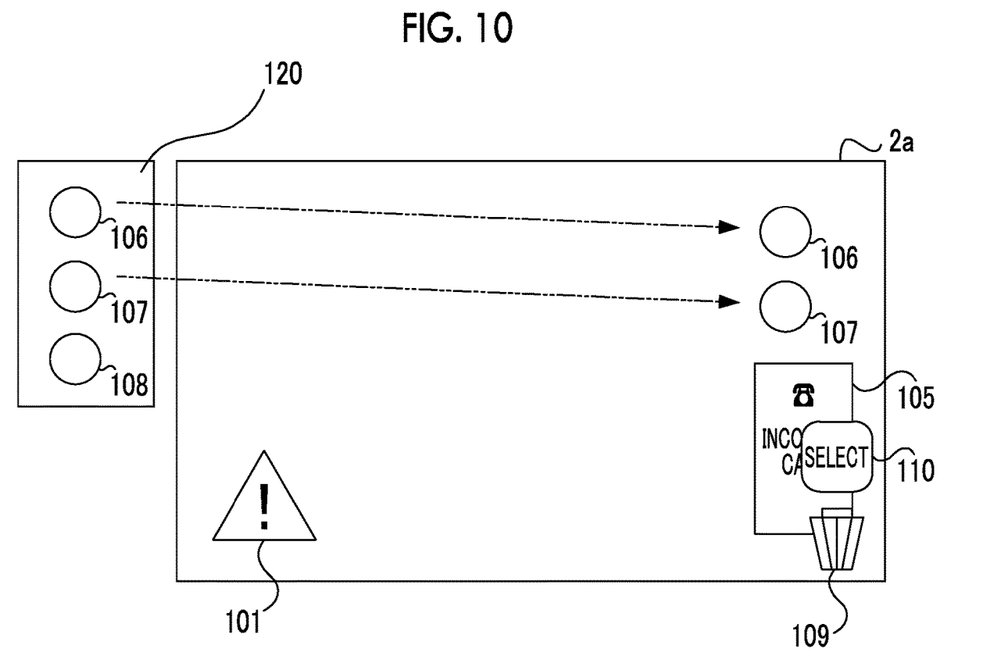
FIG. 10 is a diagram showing an example of a screen to be displayed on the display unit 10.
Figure 11:
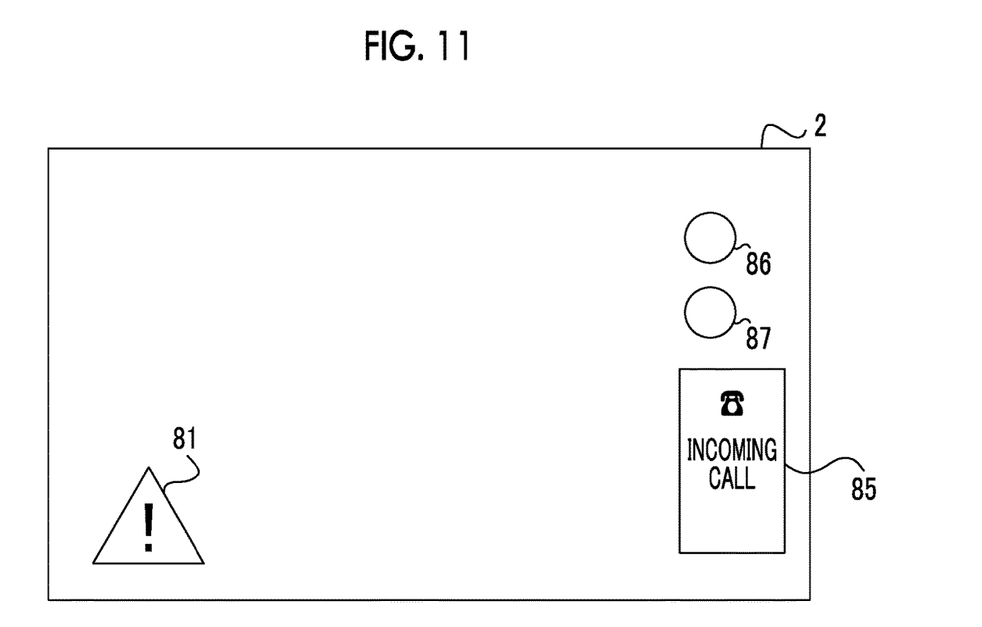
FIG. 11 is a diagram showing an example of a screen to be projected onto the projection surface 2.

In a case where the operations of the operation buttons are performed on the screen 2a shown in FIG. 9 so that the screen 2a shown in FIG. 9 is changed into a screen 2a shown in FIG. 10, as shown in FIG. 11, on the projection surface 2, a state where content 81 is projected on a lower left side and pieces of content 85 to 87 are projected on a right end side. Thus, the driver can edit the screen 2a while checking how an actual virtual image is changed.

After the operations, the driver may determine editing with respect to the reference projection image data by pressing the select button 110 on the screen 2a. In a case where the select button 110 is pressed, the designation information acquisition unit 63 of the system controller 60 stores the edited reference projection image data (image data that forms the selected screen 2a) in the storage unit 61 as customized projection image data.

The customized projection image data has a maximum number of pieces of content of 4, and is designation information for designating, in a case where the content 81 is displayed, display of the content 81 on the lower left side of the projection surface 2 with a designated size and for designating, in a case where the pieces of content 85 to 87 are displayed, display of the pieces of content 85 to 87 on the right end side of the projection surface 2 with a designated size.

The image information generation unit 62 generates projection image data including content suitable for a situation at that time on the basis of the customized projection image data stored in the storage unit 61 in this way, and inputs the projection image data to the driving unit 45.

That is, the image information generation unit 62 as necessary generates projection image data including at least one of the content 81, the content 85, the content 86, or the content 87, or empty projection image data that does not include content, and inputs the result to the driving unit 45.

In the above described second setting method, in a state where the screen 2a recommended by the manufacturing maker is displayed on the display unit 10, the driver can sort out the pieces of content, change display sizes of the pieces of content, change arrangement layouts of the pieces of content, or add content, and can perform projection of necessary information according to a driver's desire.

In the second setting method, arbitrary reference projection image data may be selected from a plurality of pieces of reference projection image data having different maximum numbers of pieces of content, different display sizes of the pieces of content, and different arrangement layouts of the pieces of content, as the reference projection image data recommended by the manufacturing maker. Thus, it is possible to increase the degree of freedom of screen editing.

Further, in the second setting method, empty reference projection image data in which a maximum number of pieces of content, display sizes of the pieces of content, and arrangement layouts of the pieces of content are not designated may be selected.

In a case where the empty reference projection image data is selected, the image information generation unit 62 displays an empty screen 2a that does not include content at all, and an operation panel 120 that includes operation buttons corresponding to all pieces of content capable of being displayed by an HUD on the display unit 10. Subsequent operations are the same as those described above. Thus, it is possible to perform more detailed customizing.

Further, in either case of the first setting method or the second setting method, customized projection image data that is edited by a user and is stored in the storage unit 61 may be selected by the user, and change with respect to the customized projection image data may be performed.

Thus, by handling customized projection image data that is already created by a user as reference projection image data, it is possible to generate new customized projection image data, to thereby efficiently perform editing of a screen according to user's intention.

As described above, in a case where the HUD shown in FIG. 1 is used, it is possible to freely change a maximum number of pieces of content to be displayed on the projection surface 2, a display size of each piece of content, and an arrangement layout of each piece of content, and to perform projection of necessary information according to a driver's desire.

In the HUD shown in FIG. 1, it is possible to freely change a display color or a display brightness of content, for example, in addition to change of a maximum number of pieces of content, display sizes of the pieces of content, and arrangement layouts of the pieces of content.

In this case, it is possible to display an operation icon for designating a display color and a display brightness of an icon corresponding to each piece of content on a screen to be displayed on the display unit 10, and to change at least one of the display color or the display brightness of each piece of content by operating the operation icon.

In a case where an operation of changing at least one of the display color or the display brightness of each piece of content is performed, the designation information acquisition unit 63 reflects information on the display color or the display brightness based on the change operation in reference projection image data during being selected to generate customized projection image data as designation information. With such a configuration, it is possible to perform projection of necessary information by a display method according to preference of the driver.

Further, in the above description, selection of content to be displayed on the HUD can be freely performed, but warning display is important information in a case where driving assistance is performed. Thus, the system controller 60 may control the operation of the operation unit 70 so that deletion of the content 81 for giving a warning is prohibited.

That is, even in a case where an operation for deleting the content 81 is performed with respect to selected reference projection image data and information for deleting the content 81 is input, the designation information acquisition unit 63 is configured to prohibit reception of the input (updating of the reference projection image data is not performed). Thus, it is possible to necessarily present the content 81 that is important information in driving assistance to the driver, and to favorably perform the driving assistance.

Further, in a case where a display size of content excessively large with respect to the projection surface 2, a visual field of an automobile in a traveling direction becomes narrow. Thus, the system controller 60 may set a maximum display size of each piece of content in advance, and may control the operation of the operation unit 70 so that the size does not exceed the maximum display size.

That is, the designation information acquisition unit 63 is configured to receive only input of information for designating the display size to become equal to or smaller than the threshold value, and to prohibit reception of input of information for designating the display size to become larger than the threshold value (for prohibiting updating of the reference projection image data), with respect to the display size of each piece of content, with respect to the selected reference projection image data. The threshold value is set to a value capable of sufficiently securing a visual field in front of the projection surface 2. Thus, it is possible to sufficiently secure the visual field in front of the projection surface 2, and to favorably perform driving assistance.

The operation unit 70 is a touch panel that belongs to the display unit 10 mounted in the automobile, physical operation buttons, or the like, but an electronic device possessed by a driver or a passenger may be used as the operation unit 70. In this case, a configuration in which the electronic device and the HUD can communicate with each other in a wireless or wired manner and an operation signal based on an operation of the electronic device is received by the system controller 60 may be used.

The electronic device is a portable computer such as a smartphone, a mobile phone with a camera, or a tablet terminal (personal digital assistant), for example. Thus, a user can customize a screen projected according to a remote operation, and can easily perform the customizing operation.

The operation unit 70 may also employ a configuration in which an operation of changing content is performed according to a driver's voice or a configuration in which an operation of changing content is performed by movement of a line of sight of a user.

In the HUD shown in FIG. 1, a configuration in which the screen 2a based on reference projection image data is displayed and the reference projection image data is edited according to an operation with respect to the screen 2a to generate and store customized projection image data is used.

As a modification example thereof a configuration in which a maximum number of pieces of content, display sizes of the pieces of content, and arrangement layouts of the pieces of content are designated as reference projection image data and a plurality of pieces of reference projection image data having different maximum numbers of pieces of content, different display sizes of the pieces of content, and different arrangement layouts of the pieces of content is stored in the storage unit 61 is provided.

Further, the designation information acquisition unit 63 may acquire reference projection image data selected by the user through an operation of the operation unit 70 from the plurality of pieces of reference projection image data stored in the storage unit 61 as designation information. In this case, the image information generation unit 62 generates projection image data on the basis of the reference projection image data acquired by the designation information acquisition unit 63 instead of the above-described customized projection image data, and inputs the result to the driving unit 45.

In this modification example, similarly, a user can project a screen according to preference of the user among a plurality of screens onto the projection surface 2, and can present necessary information by a display method according to preference of a driver.

Hereinbefore, a configuration in which a maximum number of pieces of content, display sizes of the pieces of content, and arrangement layouts of the pieces of content can be respectively changed with respect to reference projection image data has been described.

However, in a configuration in which at least one of the maximum number of pieces of content, the display sizes of the pieces of content, or the arrangement layouts of the pieces of content can be changed, similarly, it is possible to obtain an effect for presenting necessary information by a display method according to preference of a driver.

In the HUD of this embodiment capable of customizing at least one of the maximum number of pieces of content, the display sizes of the pieces of content, or the arrangement layouts of the pieces of content to be projected onto the projection surface 2, more remarkable effects are achieved as the size of the projection surface 2 becomes larger.

It is because it is predicted that the number of pieces of content capable of being projected onto the projection surface 2 greatly increases as the projection surface 2 becomes large.

Specifically, in the HUD shown in FIG. 1, in a case where the projection unit 50 projects image light that is spatially modulated by the light modulation element 44 in a range that is wider than a portion that overlaps a range where an overlook angle of a driver of a vehicle calculated from the height of the eyes of the driver in the windshield 1 becomes 30 degrees, the configuration of this embodiment capable of customizing projection content is particularly effective.

Figure 12:
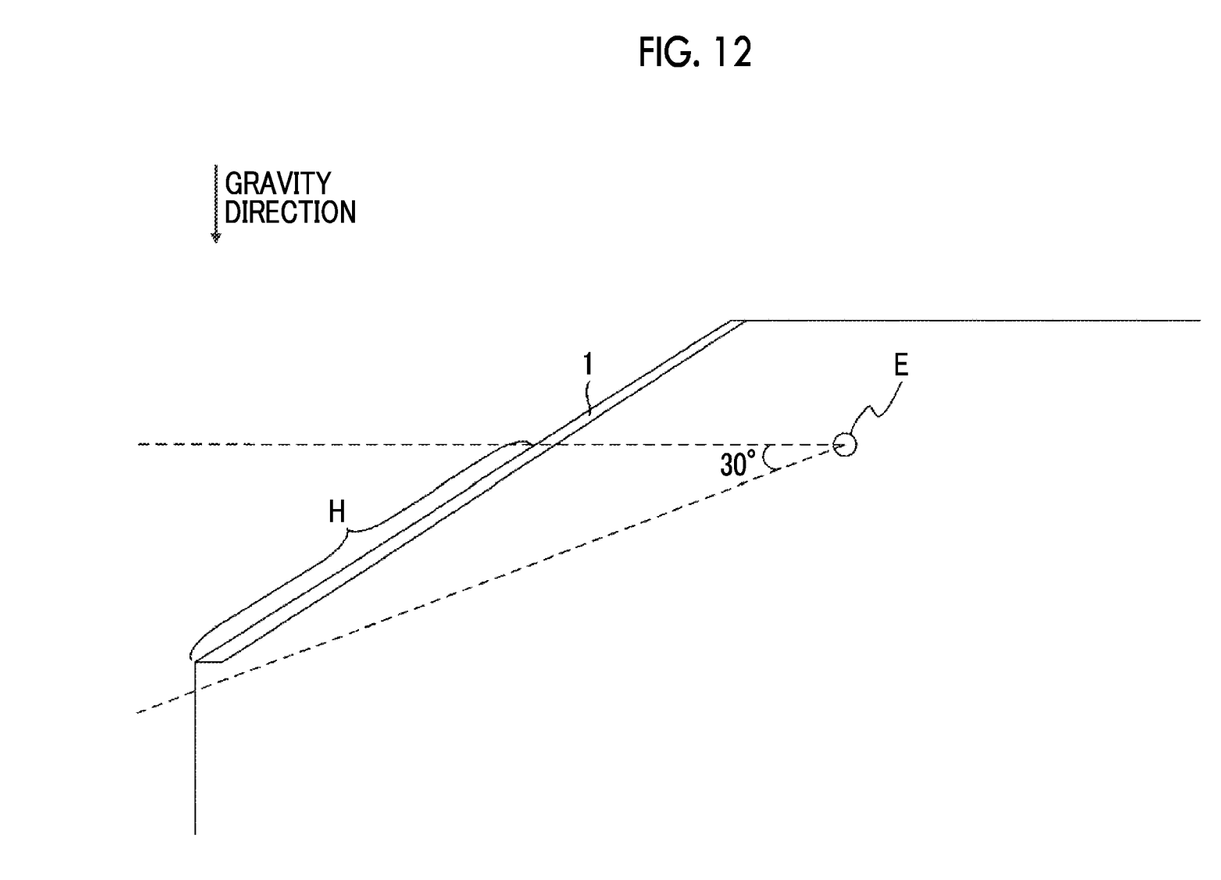
FIG. 12 is a diagram illustrating a relationship between an overlook angle of a driver and a projection range.

FIG. 12 is a diagram showing a relationship between an overlook angle of a driver and a windshield. E shown in FIG. 12 represents a central position of an eye box assumed as a range of the height of the eyes of a driver of an automobile.

A range surrounded by a plane vertical to a gravity direction including the central position E of the eye box and a plane that is inclined with respect to the plane by 30 degrees toward a ground side is a range where an overlook angle of the driver becomes 30 degrees.

A configuration in which image light is projected in a range that is wider than a range H that overlaps a range where the overlook angle becomes 30 degrees in the windshield 1 is effective in the HUD of this embodiment.

Further, in the HUD of FIG. 1, a screen based on the customized projection image data can be visually recognized as a virtual image in front of the projection surface 2. Thus, as the size of the screen presented as the virtual image becomes larger, the number of pieces of content capable of being presented to a user becomes larger, regardless of the size of the projection surface 2.

For this reason, as the size of the screen presented as the virtual image becomes large, the HUD of this embodiment shows effects. In a case where the size of the screen presented as the virtual image is 10 inches or greater, the effects particularly become great.

As described above, the following configurations are disclosed in this specification.

A disclosed projection type display device includes: a light source; a light modulation element that spatially modulates light emitted from the light source on the basis of image information; a projection unit that projects image light that is spatially modulated by the light modulation element onto a projection surface of a vehicle; a designation information acquisition unit that acquires designation information for designating at least one of a maximum number of pieces of content included in the image information, display sizes of the pieces of content, or arrangement layouts of the pieces of content on the basis of information input through an operation unit; and an image information generation unit that generates the image information on the basis of the designation information acquired by the designation information acquisition unit.

The disclosed projection type display device is configured so that the designation information acquisition unit acquires reference information selected from a plurality of pieces of reference information that serve as references indicating the designation of the maximum number of pieces of content included in the image information, the display sizes of the pieces of content, and the arrangement layouts of the pieces of content, as the designation information, on the basis of information input through the operation unit.

The disclosed projection type display device is configured so that the designation information acquisition unit acquires information obtained by editing pieces of reference information that serve as references indicating the designation of the maximum number of pieces of content included in the image information, the display sizes of the pieces of content, and the arrangement layouts of the pieces of content, as the designation information, on the basis of information input through the operation unit.

The disclosed projection type display device is configured so that the designation information acquisition unit acquires information obtained by editing pieces of reference information that serve as references indicating non-designation of the maximum number of pieces of content included in the image information, the display sizes of the pieces of content, and the arrangement layouts of the pieces of content, as the designation information, on the basis of information input through the operation unit.

The disclosed projection type display device is configured so that the designation information acquisition unit prohibits, with respect to content for performing a warning to a driver in the content designated using the reference information, reception of input of information for deleting the content for the warning through the operation unit.

The disclosed projection type display device is configured so that the designation information acquisition unit receives only input of information for designating the display size of the content to be equal to or smaller than a threshold value, with respect to information for designating the display size of the content in the reference information.

The disclosed projection type display device is configured so that the designation information acquisition unit further acquires information for designating at least one of a display color or a display brightness of the content included in the image information, as the designation information.

The disclosed projection type display device is configured so that the projection surface is a windshield of the vehicle and the projection unit projects the spatially modulated image light in a range that is wider than a portion that overlaps a range where an overlook angle of a driver of the vehicle calculated from the height of the eyes of the driver is 30 degrees, in the windshield.

The disclosed projection type display device is configured so that the projection unit performs the projection so that an image based on the spatially modulated image light is visually recognizable as a virtual image, and so that a virtual image having a display size of 10 inches or greater is visually recognizable.

INDUSTRIAL APPLICABILITY

The projection type display device of the invention is mounted, particularly, in an automobile, which provides high comfort and effectiveness.

EXPLANATION OF REFERENCES

2: projection surface
3: dash board
40: light source unit
45: driving unit
50: projection unit
60: system controller
62: image information generation unit
63: designation information acquisition unit

What is claimed is:

1. A projection type display device comprising:
   a light source;
   a spatial light modulator that spatially modulates light emitted from the light source on the basis of image information;
   a projector that projects image light that is spatially modulated by the spatial light modulator onto a projection surface of a vehicle;
   an interface that includes a display on which a screen corresponding to a virtual image of content which is formed by the image light projected on the projection surface is displayed, and operates an operation of changing the content being projected on the projection surface according to a touch operation on the interface and generates designation information accordingly;
   a processor that acquires the designation information for designating arrangement layouts of pieces of the content on the basis of the touch operation performed on the interface, and generates the image information on the basis of the designation information,
   wherein, the processor edits the designation information based on the touch operation performed on the interface that edits the arrangement layouts of the pieces of the content included in the image information, and generates the image information based on the edited designation information,
   wherein the display has a first region and a second region, the display displays the screen which corresponds to the virtual image of the content in the first region and an operation button which is not corresponding to the virtual image of the content in the second region, and when the touch operation is a movement of the operation button from the second region to the first region through a drag and drop operation of the touch operation, the processor edits the designation information to generate the image information including the operation button that is moved from the second region to the first region,
   wherein the projection surface is a windshield of the vehicle, and the projector projects the spatially modulated image light in a first range that is wider than a portion of the windshield that overlaps a second range where an overlook angle of a driver of the vehicle calculated from an height of eyes of the driver is 30 degrees, in the windshield.

2. The projection type display device according to claim 1, wherein the processor acquires reference information selected from a plurality of pieces of reference information that serve as references indicating the designation of the arrangement layouts of the pieces of the content, as the designation information, on the basis of information input through the interface.

3. The projection type display device according to claim 1, wherein the processor acquires information obtained by editing pieces of reference information that serve as references indicating non-designation of the arrangement layouts of the pieces of the content, as the designation information, on the basis of information input through the interface.

4. The projection type display device according to claim 3,
wherein the processor further acquires information for designating at least one of a display color or a display brightness of the content included in the image information, as the designation information.

5. The projection type display device according to claim 1, wherein the processor prohibits, with respect to warning content for performing a warning to the driver in the content designated using the reference information, reception of input of information for deleting the warning content for the warning through the interface.

6. The projection type display device according to claim 5,
wherein the processor further acquires information for designating at least one of a display color or a display brightness of the content included in the image information, as the designation information.

7. The projection type display device according to claim 1,
wherein the processor further acquires information for designating at least one of a display color or a display brightness of the content included in the image information, as the designation information.

8. The projection type display device according to claim 1,
wherein the projector performs the projection so that an image based on the spatially modulated image light is visually recognizable as the virtual image, and so that the virtual image having a display size of 10 inches or greater is visually recognizable.

9. The projection type display device according to claim 1,
wherein the drag operation is an operation in a vertical direction and a horizontal direction with respect to the display, and a position of the operation button in the first region is determined by the drag and drop operation.

10. The projection type display device according to claim 1,
wherein the operation button that is moved from the second region to the first region is projected on the projection surface at the same layout as the layout in the second region of the display.

\* \* \* \* \*